United States Patent [19]

Michaelsen

[11] Patent Number: 4,817,538

[45] Date of Patent: Apr. 4, 1989

[54] CONSTRUCTION SYSTEM FOR SHELVES

[75] Inventor: Jorgen Michaelsen, Frejasvey, Denmark

[73] Assignee: Bang & Olufsen of America, Inc., Mt. Prospect, Ill.

[21] Appl. No.: 668,961

[22] Filed: Nov. 7, 1984

Related U.S. Application Data

[63] Continuation-in-part of Ser. No. 615,246, May 30, 1984, abandoned.

[51] Int. Cl.[4] ............................................. A47B 96/06
[52] U.S. Cl. .................................... 108/108; 52/239; 108/60; 108/64; 211/90; 211/184
[58] Field of Search ............... 108/108, 111, 60, 110, 108/109, 64; 312/140, 111, 108, 263; 52/239, 36, 487, 772; 211/90, 87, 94, 107, 184

[56] References Cited

U.S. PATENT DOCUMENTS

| | | | |
|---|---|---|---|
| 1,199,524 | 9/1916 | Bourn | 108/60 X |
| 2,143,034 | 1/1939 | Sakier . | |
| 2,319,278 | 5/1943 | Urbain | 52/36 X |
| 2,490,663 | 12/1949 | Van Uum et al. . | |
| 2,744,714 | 5/1956 | Parke | 52/36 X |
| 2,788,949 | 4/1957 | Gurries . | |
| 2,853,870 | 9/1958 | Sinner et al. . | |
| 2,947,093 | 8/1960 | Masters | 52/36 X |
| 2,994,413 | 8/1961 | Levy et al. | 52/36 |
| 3,102,499 | 9/1963 | Shelor | 108/108 X |
| 3,143,980 | 8/1964 | Sperring . | |
| 3,163,132 | 12/1964 | Nelson . | |
| 3,174,592 | 3/1965 | Berman et al. . | |
| 3,182,769 | 5/1965 | Ridder | 108/64 X |
| 3,202,290 | 8/1965 | Harvey | 211/184 X |
| 3,226,900 | 1/1966 | Blomqvist . | |
| 3,276,179 | 10/1966 | Rallis . | |
| 3,290,846 | 12/1966 | Mader et al. . | |
| 3,300,926 | 1/1967 | Heirich . | |
| 3,342,000 | 9/1967 | Cripe . | |
| 3,425,568 | 2/1969 | Albright | 211/87 |
| 3,513,786 | 5/1970 | Kellogg | 108/64 |
| 3,557,499 | 1/1971 | Dickie et al. . | |
| 3,563,626 | 2/1971 | Ferdinand et al. . | |
| 3,685,465 | 8/1972 | Haumer . | |
| 3,693,556 | 9/1972 | Rous . | |
| 3,705,002 | 12/1972 | Varlonga | 52/487 X |
| 3,733,756 | 5/1973 | Butler . | |
| 3,765,344 | 10/1973 | Ferdinand et al. . | |
| 3,790,243 | 2/1974 | Whorton, III . | |
| 3,859,763 | 1/1975 | Dahm . | |
| 3,866,550 | 2/1975 | Geschwender . | |
| 3,868,021 | 2/1975 | Heinrich . | |

(List continued on next page.)

FOREIGN PATENT DOCUMENTS

| | | | |
|---|---|---|---|
| 779115 | 2/1968 | Canada | 108/109 |
| 2011792 | 10/1971 | Fed. Rep. of Germany | 211/184 |
| 2101787 | 6/1972 | Fed. Rep. of Germany | 52/36 |
| 2610712 | 9/1977 | Fed. Rep. of Germany . | |
| 1166799 | 11/1958 | France . | |
| 1427967 | 1/1966 | France . | |
| 2308746 | 11/1976 | France | 52/487 |
| 2450582 | 11/1980 | France | 211/94 |
| 567869 | 10/1957 | Italy | 108/64 |

OTHER PUBLICATIONS

Bang & Olufsen Brochure—"Expo Accenta Wall System", 2 pages, 3/1983.

Primary Examiner—Peter A. Aschenbrenner
Assistant Examiner—Thomas A. Rendos
Attorney, Agent, or Firm—Willian Brinks Olds Hofer Gilson & Lione Ltd.

[57] ABSTRACT

Construction system for shelves comprising shelves and rear panelling plates, and in which the shelves at their rear end are insertable in upright or wall mounted consoles from which the shelves are cantilevered. The consoles are hidden behind the vertically extending rear panelling plates which are mounted horizontally spaced from the uprights or from the wall. Each console constitutes a horizontally mounted profile support rail for continuously supporting at least one shelf along its rear edge engaging its top side and its bottom side along rear edge zones of which the top side edge zone is closer to the rear edge of the shelf than the bottom side edge zone.

4 Claims, 7 Drawing Sheets

U.S. PATENT DOCUMENTS

| | | |
|---|---|---|
| 3,881,794 | 5/1975 | Henning . |
| 4,006,947 | 2/1977 | Haag et al. . |
| 4,043,086 | 8/1977 | Kaulfuss et al. . |
| 4,067,161 | 1/1978 | Rensch . |
| 4,107,887 | 8/1978 | Wendt . |
| 4,119,287 | 10/1978 | Mollenkopf . |
| 4,125,338 | 11/1978 | Lew ................................ 312/263 X |
| 4,163,350 | 8/1979 | Doguchi et al. ................... 52/772 X |
| 4,180,297 | 12/1979 | Abrams . |
| 4,189,123 | 2/1980 | Johnson . |
| 4,211,379 | 7/1980 | Morgan et al. . |
| 4,223,505 | 9/1980 | Krebel et al. . |
| 4,224,769 | 9/1980 | Ball et al. ................................ 52/36 |
| 4,381,715 | 5/1983 | Forman ........................... 108/108 X |
| 4,403,554 | 9/1983 | Valentine et al. . |
| 4,429,850 | 2/1984 | Weber et al. .................... 108/108 X |
| 4,441,300 | 4/1984 | Varon et al. . |
| 4,497,356 | 2/1985 | Luck et al. ........................... 52/36 X |

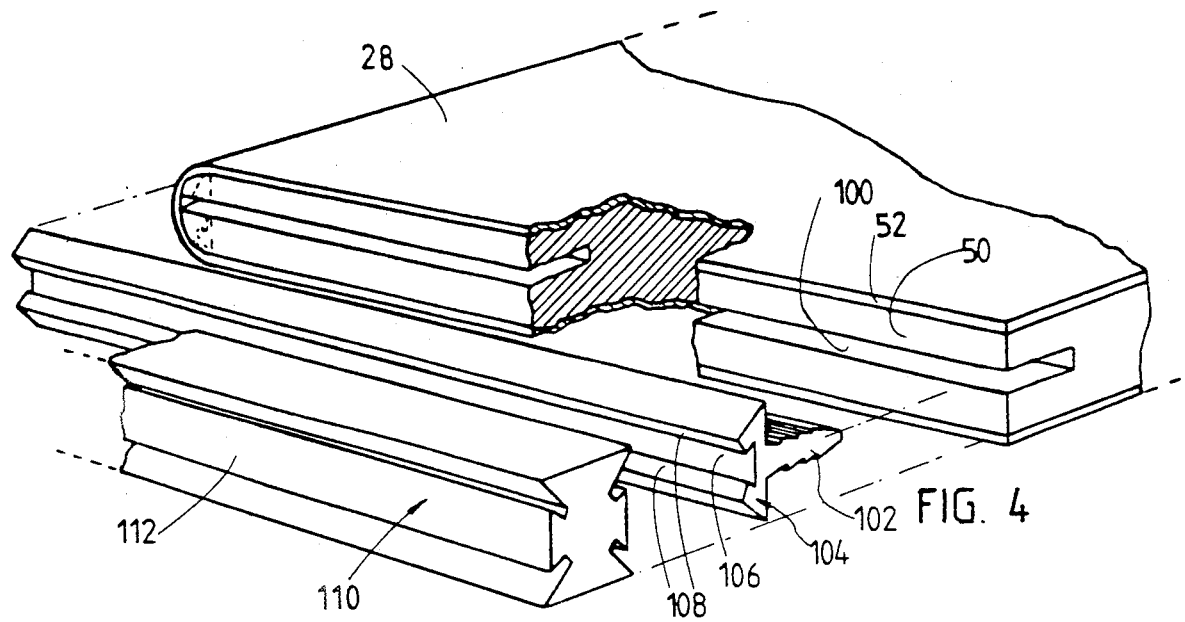
FIG. 4
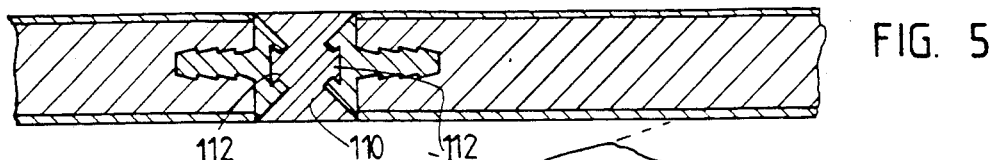
FIG. 5
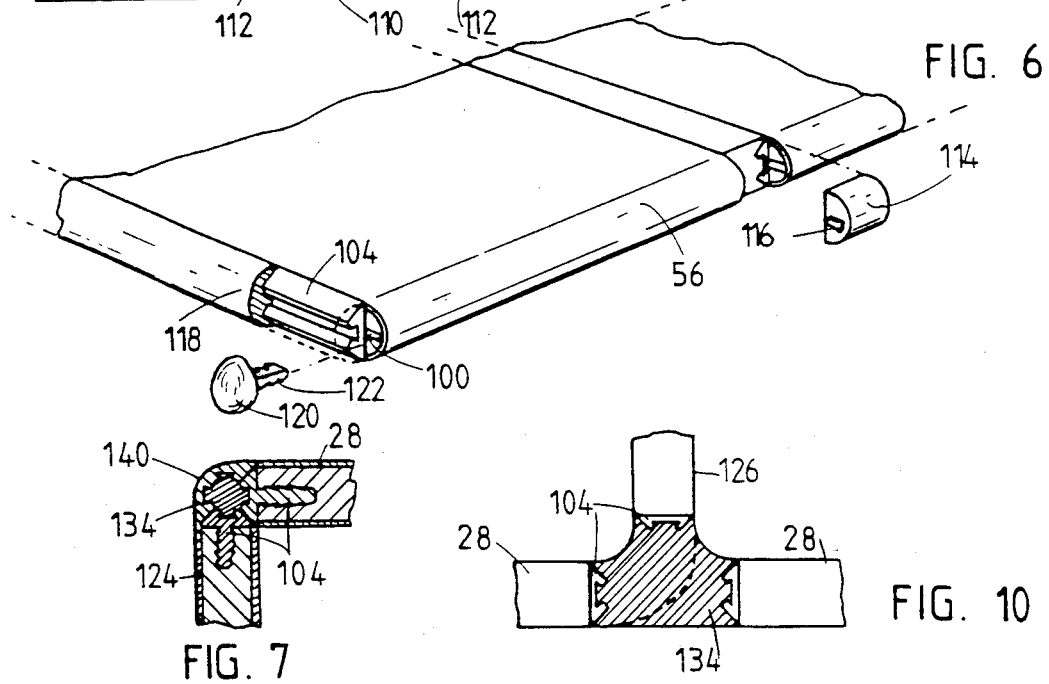
FIG. 6
FIG. 7
FIG. 10

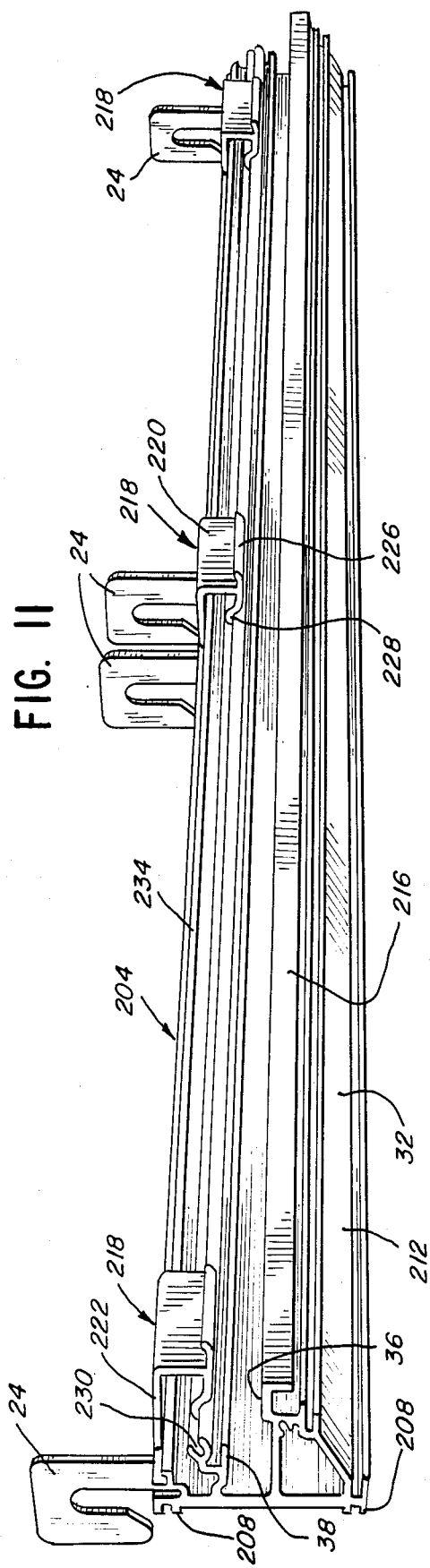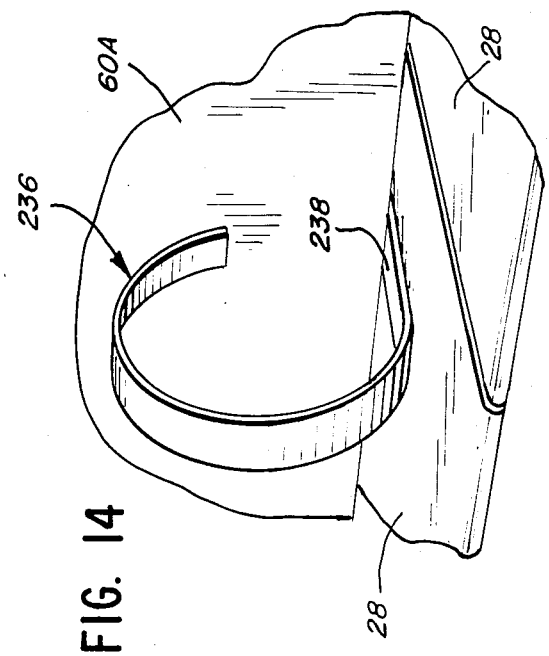

CONSTRUCTION SYSTEM FOR SHELVES

RELATED APPLICATION

This is a continuation-in-part of my copending application, Ser. No. 615,246, filed May 30, 1984, now abandoned.

BACKGROUND OF THE INVENTION

The present invention relates to a construction system for shelves comprising shelves and rear panelling plates, and in which the shelves at their rear edge are insertable in upright or wall mounted consoles from which the shelves are cantilevered. The consoles are hidden behind the vertical extending rear panelling plates which are mounted horizontally spaced from the uprights or from the wall.

One of the objects of the present invention is to provide a novel construction system for shelves of the above mentioned type and in which the shelves are supported in such a way that higher loads can be applied to the shelves.

Another object is to distribute the effect of a load on one shelf to adjacent shelves and, thus, ensure that the front edges of a shelf and its adjacent shelves are mutually in line.

Another object is to provide a novel construction system for shelves in which the panelling plates do not support the shelves but are carried by the same means as support the shelves.

Another object is to provide a shelf, for a construction system for shelves, in which the shelf has a less tendency of being brought out of its plane.

In prior construction systems of which the most relevant seems to be disclosed in German Patent Publication No. 2610712, the shelves are supported partly by the rear panelling plate of the system and partly by blocks between which the inner end corners of the shelf are engaged.

In such a system the load of each shelf is multiplied by a factor of more than two before it is transferred to the rear panelling plates below. This means that each panelling plate must be able to support the added multiplied loads of all shelves above the rear panelling plate in question unless each panelling plate is not rigidly connected to the wall or the uprights.

Furthermore, each shelf is exposed for relatively high stresses in the zone of each rear shelf corner where it is in engagement with one of said blocks.

To eliminate the above drawbacks each supporting console according to the invention constitutes a profiled, horizontally mounted support rail for continuously supporting at least one shelf along its rear edge and which engages each shelf on its top side and its bottom side along rear edge zones of which the top side edge zone is closer to the rear edge of the shelf than the bottom side edge zone. Thereby no loads from the shelves will be transferred to the rear panelling plates and no relatively extreme stresses will occur at the rear corners of the shelves.

At given shelf material and dimension this results in higher loads allowable for the shelf than is the case in prior art shelves. Furthermore, the material and the thickness of the rear panelling plate are independent of the loads applied to the shelves and to the number of shelves above the panelling plate in question. Instead of carrying the load from shelves each panelling plate may be partly or entirely carried by these support rails.

The above and further objects and novel features of the present invention will be apparent from the description set forth below when read with the accompanying drawings, the latter being for the purpose of illustration only and not defining the limits of the invention, reference for this latter purpose being had to the appended claims.

DESCRIPTION OF THE DRAWINGS

FIG. 4 is an exploded perspective view of a shelf end seen from the right corner with end connecting means;

FIG. 5 is a longitudinal cross section of two shelves and a cross section of their connecting means;

FIG. 6 is a perspective view of the right front corner of a shelf and its neighbor shelf;

FIG. 7 is a cross section of a corner connecting means at one shelf end and a vertical end plate;

FIG. 10 is a front view of another embodiment of a T-connecting means, which may have correspondingly formed corner and cross connecting means;

FIG. 11 is a perspective view of a construction system embodying a modified form of the system;

FIG. 13 is a perspective view of a bookend for use with the system of FIGS. 11-12; and FIG. 14 is a perspective view of the bookend of FIG. 13 in position between a shelf and a rear panelling plate.

DETAILED DESCRIPTION OF THE PREFERRED EMBODIMENTS

Figure 1:
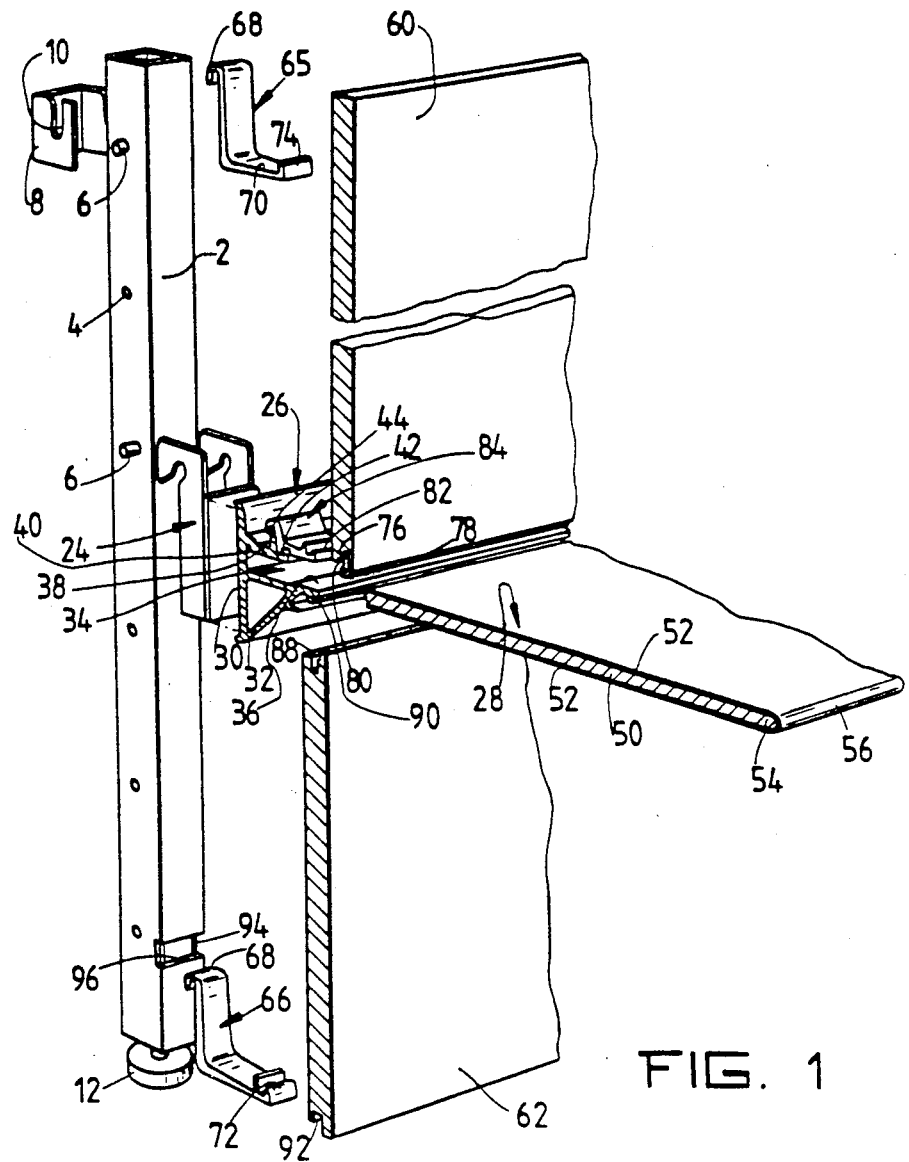
FIG. 1 is a perspective exploded view, partly in section, of a construction system embodying one form of the system.
Figure 2:
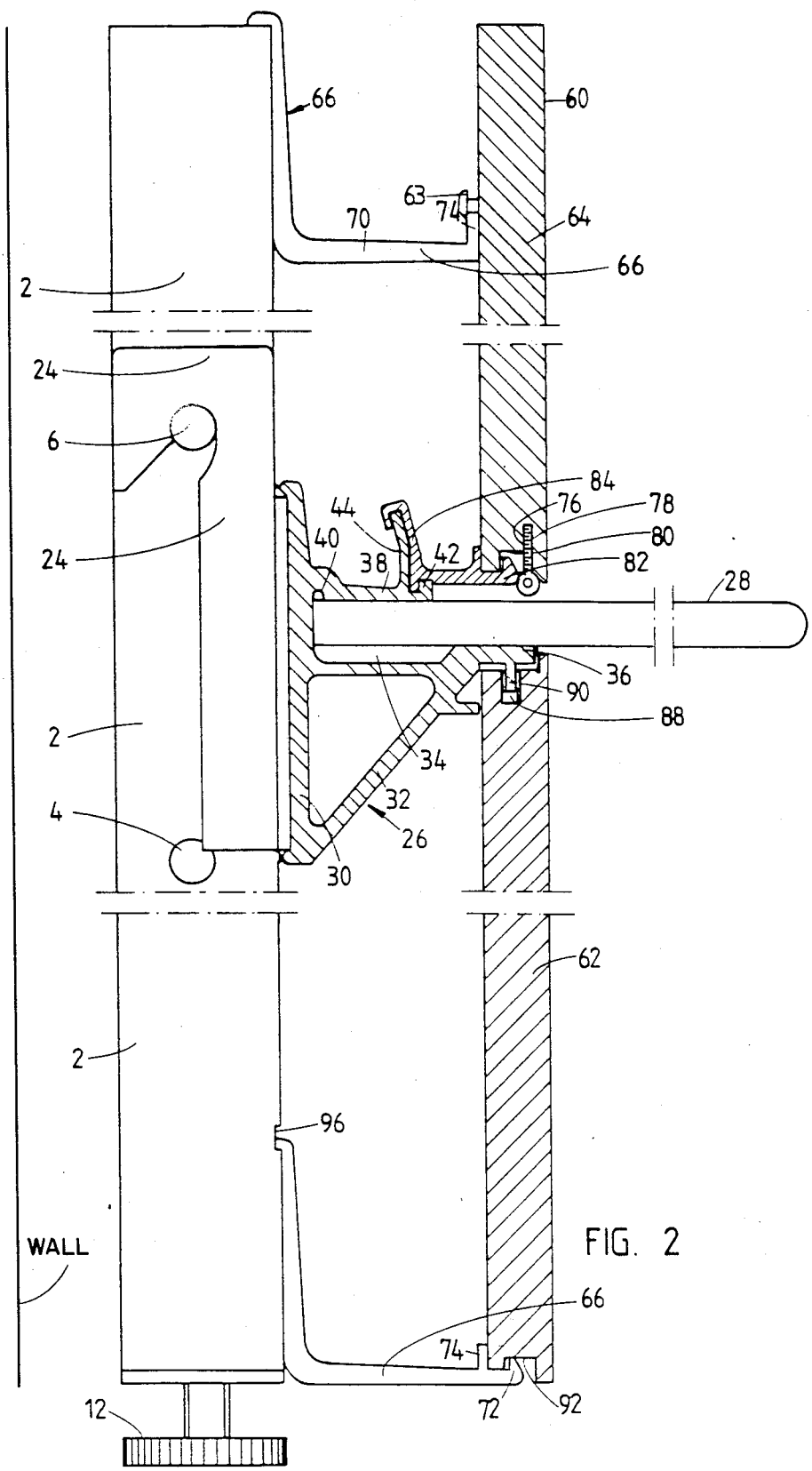
FIG. 2 is a cross section of the system mounted on uprights.

Referring to the drawings, and in particular to FIGS. 1 and 2 there is shown one form of the system embodying the present invention and comprising supporting uprights 2 having opposite mounting holes 4 for supporting pins 6 which may engage a wall console 8 via its slots 10. The supporting uprights 2 have an adjustment screw 12 in their lower ends. The pins 6 may also support shelf consoles 24 to which a horizontal support rail 26 is secured by known fastening means, e.g. screws, rivets or weldings. The support rail 26 supports one or several detachable shelves 28 and comprises a rear vertical flange 30 to be mounted on the consoles 24, a lower flange 32 stiffening the rail 26, a slot 34 having a width greater than the thickness of the shelf 28, a shelf supporting lower flange 36 and an upper flange 38 having a rear groove 40. The lower flange 36 and the upper flange 38 define a vertical gap, i.e. the slot 34 for receiving and maintaining the shelf 28 in a position perpendicular to the rear flange 30 and hence perpendicular to the uprights 2. If the uprights 2 are vertical, the shelves 28 will be mounted horizontally in the rail 26 which then functions as a support console for the shelves 28.

The upper surface of the flange 36 extends a distance from the rear flange 30, this distance being longer than the distance of which the downwards turned surface of the flange 38 extends from the rear flange 30. This means that the flange 36 supports a rear edge zone of the shelf 28 positioned farther from the rear edge of the shelf than another rear edge zone of the shelf 28 engaged with the flange 38. In other words, the flanges 38 and 36 of the support rail 26 engages each shelf 28 on its top side and its bottom side along rear edge zones of which the top side edge zone is closer to the rear edge of the shelf than is the bottom side edge zone. The groove 40 may receive and lock an upstanding part at the rear edge of the shelf 28, but experiments have shown that such projecting part in most applications is superfluous.

The flange 38 is provided in its outermost end with an upward projecting short flange part 42 and a longer flange part 44 a short distance behind the part 42.

The shelf 28 as shown in FIG. 1 may be inserted into the gap 34 of the rail 26 and placed abutting the rear flange 30 with its rear edge, and abutting the flanges 38 and 36 via a top side zone and a bottom side zone, respectively, when inserted into the support rail 26. The shelf 28 is shown in its inserted position in FIG. 2. A rear list 46 which, as mentioned above, may protrude slightly upwardly from the rear edge of shelf 28 for engagement within groove 40 when inserted into support rail 26. The shelf 28 is shown in its inserted position in FIG. 2.

The shelf 28 consists of a rigid plate member 50 which at least has a large compressive strength, and a single sheet material 52 adhered to the plate member 50 at least along its top side, bottom side, and possibly also its front edge 54 to form a sandwiched shelf, the front edge 56 of the sheet material 52 optionally being smoothly rounded, e.g. having a radius of curvature corresponding to half of the shelf thickness. The plate member 50 which forms a rectangular core element may have a thickness of only 10 mm, if e.g. wood, chip board, plywood or plastic honeycombed material are used, and the sheet material 52 may be a single layer of plywood, 1 mm thick, fiber reinforced plastic sheet, 0.1-2 mm thick, or preferably aluminum sheet, 0.1-2 mm thick. This embodiment provides a shelf which is especially well suited for the present construction system where the shelves are supported mainly along their whole rear edge extent. When a smooth rounded front edge 56 is used for the sheet material 52, not only is a pleasing appearance obtained, but a very rigid front edge of the shelf 28 remains rectilinear even when loaded with books, electronic material or other heavy loads.

The upper and lower rear panelling plates 60, 62 are supported by hangers 65, 66 as shown in FIGS. 1 and 2 of which the upper one in FIG. 2 is in engagement with the shaft behind the head of a screw 63 on the panelling plate 60 and in engagement with the upper end of the tubular supporting upright 2 via a hook member 68. The hangers 65, 66 are formed as a right-angled piece of which one leg abuts the outer surface of the upright 2 and the other protruding leg 70 carries one or two upstanding flanges 72 and 74 adapted to be engaged with the shaft of the screw 63 and with a longitudinal recess 92 in the bottom edge of the panelling plate 62, respectively.

In the bottom edge of the panelling plate 60 is formed a longitudinal recess 76 for receiving and holding a soft strip of filler material 78, e.g. a rubber or plastic profile. Along the recess 76 is shown a wider but less deep longitudinal recess 80 for engagement with an upstanding flange 82 at the outer end of a support piece 84 which is also engageable with the support rail 26 via its flange parts 42 and 44 as shown in FIG. 2. Several support pieces 84 are affixed mutually spaced along the support rail 26 at its uppermost front edge, i.e. at its flange parts 42, 44 and thus supporting the rear panelling plate 60, so that its bottom edge is kept in a short distance from the top side of the shelves 28 thereby forming a gap for passing through this gap tubes, hoses, electrical cables and other connecting lines between the support pieces 84.

The upper edge of the rear panelling plate 62 has a longitudinal recess 88 into which a longitudinal flange 90 protrudes down from the lowermost outer end of the lower flange 36 of the rail 26. Thereby the panelling plate 62 is supported by the lowermost hanger 66 via the recess 92 and maintained in place at its top edge via the recess 88 and the flange 90. The lower hanger 66 abuts via its vertical leg the upright 2 and is via its hook member 68 in engagement with a horizontal front edge 96 formed in the hollow upright 2 by a horizontal milled recess 94.

Figure 3:
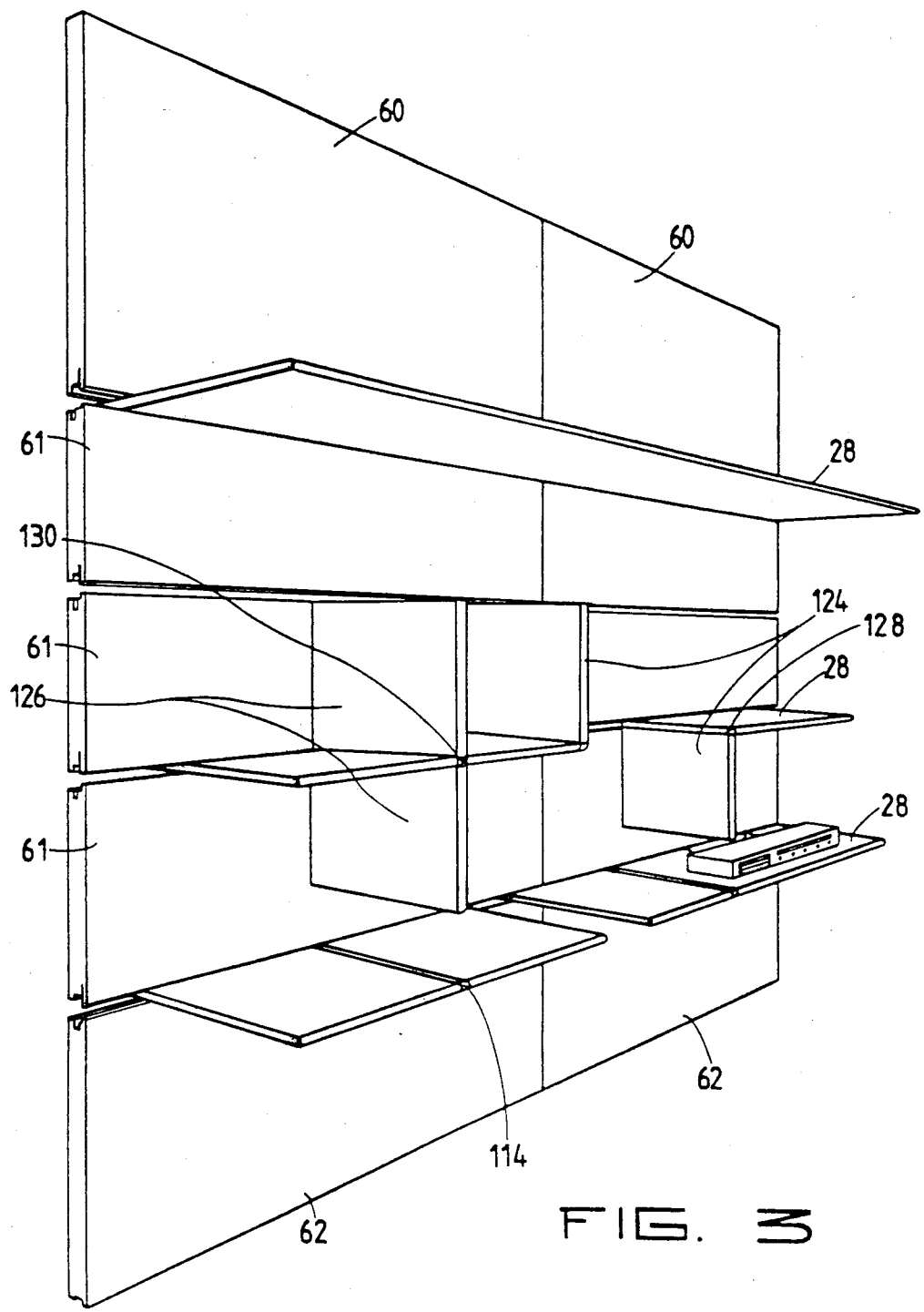
FIG. 3 is a perspective view of the system with one arrangement of the shelves.

The uppermost panelling plate 60 is as shown supported by the support pieces 84 as well as by the uppermost hanger 65, and the lowermost panelling plate 62 is supported by the lowermost hanger 66 alone, but kept in place in vertical position by the longitudinal flange 90. However, when more than one shelf or suite of shelves are placed above and below each other the intermediate rear panelling plates, not shown, are supported only at their bottom edge by the support pieces 84 on the rail 26 supporting the shelves below, but maintained in place in vertical position by the longitudinal flange 90 of the rail 26 supporting the shelves 28 above the intermediate panelling plate. An arrangement of intermediate rear panelling plates 61 is shown in FIG. 3, which will be explained further in connection with FIGS. 4-9.

In FIG. 4 is shown in more detail the left side edge of a shelf 28, the right side edge of which is formed laterally reversed. A center recess 100 extends along the edge for very tightly fitting and receiving a longitudinal flange 102 having longitudinal surface cogging, this flange 102 being the fixing member of a connecting means 104 in the form of an edge covering capping having an undercut recess 106 and two inclined flanges 108 forming a dovetail recess to be joined with a correspondingly formed flange 112 having a dovetailed cross section on a connecting means 110 as shown in FIGS. 4 and 5. By these means the shelves 28 in one level of the system are mutually connectable along their side end edges via the connecting means 104, 110 that are able to transfer tractive and shear forces between the shelves 28. Thereby a heavy load on one shelf 28 is not only carried by its own shelf but also by the adjacent shelves connected by the connecting means to the loaded shelf. This results in the front edge of the loaded shelf being maintained substantially in line with the front edge of the adjacent shelves and also in the loads on connected shelves in one level being distributed over more adjacent shelves. This effect is further increased when the connecting means 104, 110 as shown are also adapted to transfer bending moment between the shelves 28 to make the connection bending resistant.

The connecting means 104 comprises a profiled rod e.g. an extruded profile made of plastic or metal such as aluminum, which rod is rigidly connected to and along the side end face of the shelf 28 and is engageable with a complementary profiled rod of the adjacent shelf 28, optionally via an intermediate complementary profiled rod 110.

In cases where the shelves in one level are not intended to be connected to vertical partitions no intermediate rods 110 are needed.

In FIG. 6 is shown how the capping 104 is used in connection with the dovetailed rod 110 and a connection terminating means 114 in the form of a half cylinder piece having barbs 116 engageable with the front edge 56 of the sheet material 52 preventing it from being too easy to remove once mounted.

Also a shelf end cover 118 is shown having a semicylindrical outer face and an inner face formed complementary to the capping 104, and a shelf single front corner terminating means 120 provided with a cogged flange 122 tightly insertable into the recess 100, the means 120 having an outer face in the form of a quarter of a sphere in order to establish a smooth transitional form between the rounded front edge 56 and the rounded outer face of the shelf end cover 118.

Because of the above mentioned intermediate and complementary profiled rods 110, it is possible to modify these also to serve as connecting means for vertical end plates 124 and 126 of the individual shelves 28. Samples of such modified profiled connecting rods 134, 136 and 138 are shown in FIGS. 7-10.

In FIG. 7 is shown a vertical shelf terminating plate 124 connected via the rod 128 to a horizontal shelf 28, the plate 124 having same connecting flanges 102 as the shelf 28 but shorter in length since the plate 124 terminates in front of the rear panelling plates 60-62 whereas the shelf 28 pass the gap 34 between the panelling plates. A cover profile list 140 is inserted along the rod 134 and the two cappings 104, the list 140 having a complementary cross section as shown in FIG. 7. A double front corner terminating means 128 (FIG. 3) provides a smooth transitional form connecting the front edges of the shelf 28 and of the vertical end plate 124 and of the outer surface of the list 140.

Similarly, as appears from FIG. 3, a quadruple corner terminating means 130 provides a smooth transitional form connecting the front edges of the adjacent two shelves 28 and the adjacent two vertical end plates 126.

Figure 8:
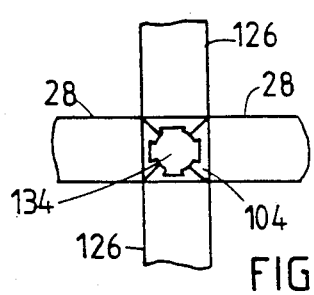
FIG. 8 is a front view of a cross connecting means between two adjacent shelves and two vertical partition plates.
Figure 9:
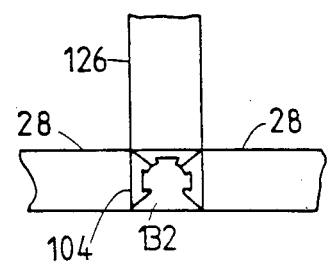
FIG. 9 is a front view of a T-connecting means between two shelves and a vertical partition plate.

The same connecting rod 134 may be used in all combinations of connections of FIGS. 7-9, but also special rods 136, 138 as shown in FIG. 9 or 10 may be used.

In FIG. 10, the connecting rod 138 provides rounded internal corners between the shelves 28 and the vertical partition plate 126. This will slightly amend the appearance of the construction system, where special adapted front corner termination means must be designed, but furthermore a system of shelves is obtained which is easy to clean in the corners. This is important when the system is used in places where furniture must be easy to clean in all corners, e.g. in hospitals, exhibition rooms and in laboratories.

FIG. 3 shows an embodiment of a layout for a construction system for shelves according to the invention. Long as well as short shelves 28 may be incorporated in the system. Some of the vertical sections of panelling plates 60-62 may have less gaps for insertion of shelves than shown, e.g. some of the panelling plates may have slightly more than the double or triple height of the rear panelling plate 61.

A special feature of the system is that the panelling plates 60-62 are completely unaffected by the loads carried by the other shelves so that these plates 60-62 do not need to be dimensioned for heavy loads.

Figure 12:
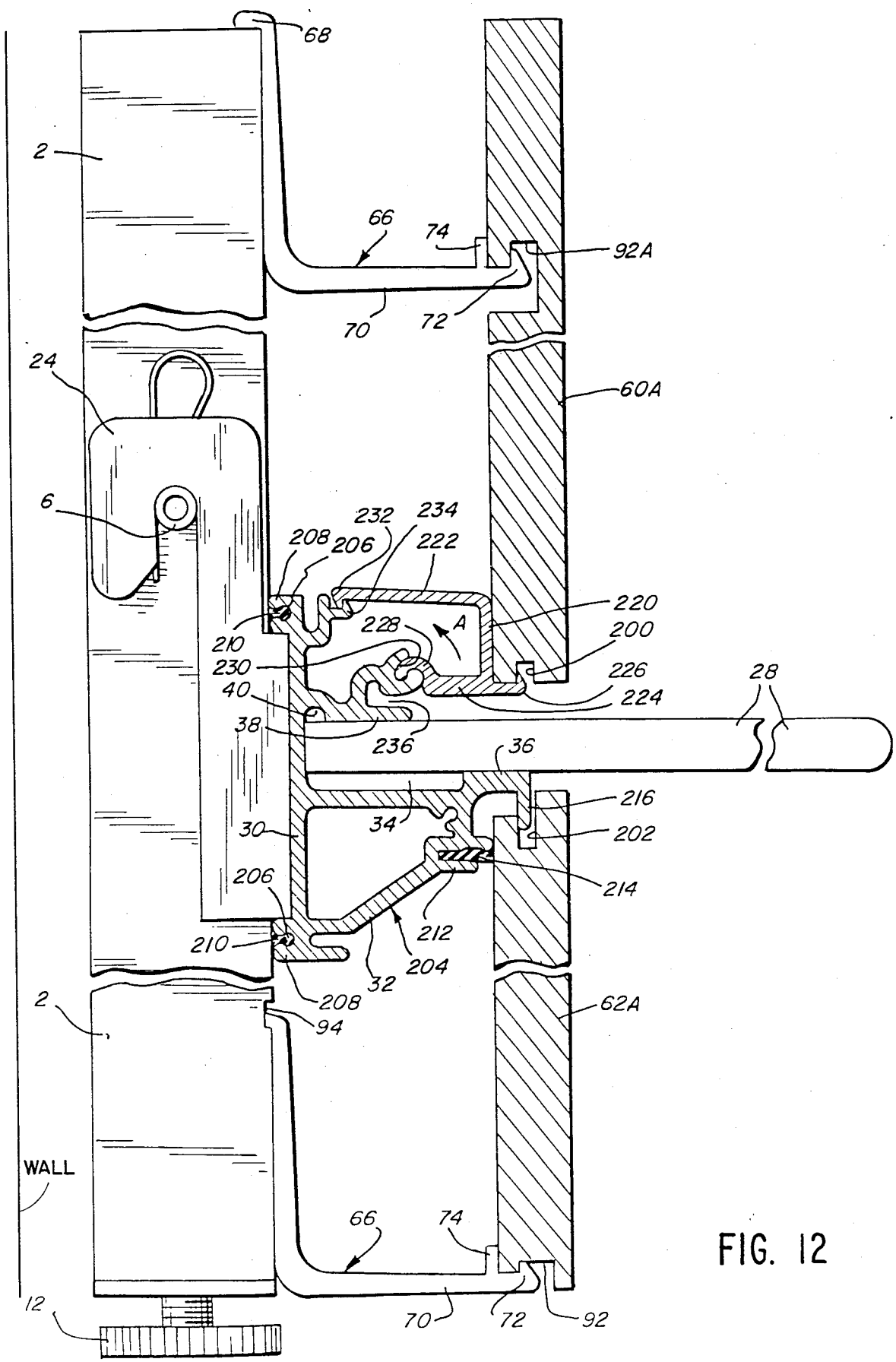
FIG. 12 is a cross section of the system of FIG. 11 mounted on uprights.

FIGS. 11 and 12 show a modified form of the shelving system and like numerals will be applied for like components described in relation to the form of the invention shown in FIGS. 1 and 2.

More particularly, the embodiment shown in FIGS. 11 and 12 also include supporting uprights 2 having upper and lower hangers 66 engageable within recesses 92A and 92 of upper and lower rear panelling plates 60A and 62A. It can be seen in this embodiment the upper and lower hangers are of identical construction, with recess 92A of panelling plate 60A replacing screw 63 (Fig. 2). Shelf consoles 24 also are used for securing thereto support rails (described hereinafter) by hanging the shelf consoles on supporting pins 6.

The bottom edge of rear panelling plate 60A differs from rear panelling plate 60 in that a narrower recess 200 is provided, as shown. Also, rear panelling plate 62A differs from rear panelling plate 62 in that a single-stepped recess 202 is provided along the upper edge of the panelling plate, as shown in FIG. 12, as compared to the multi-stepped recess 88 shown in FIG. 2.

A modified form of support rail 204 includes a rear vertical flange 30 mounted on console 24 as described above, a lower flange 32 stiffening the rail, a shelf supporting lower flange 36 and an upper flange 38 having a rear groove 40, with a slot 34 having a width greater than the thickness of shelf 28. All of these components function similarly to those described in relation to support rail 26 shown in FIGS. 1 and 2. In particular, upper flange 38 and lower flange 36 support the shelf in cantilevered fashion along the rear edge of the shelf be engaging its top side and its bottom side along rear edge zones of which the top side edge zone (flange 38) is closer to the rear edge of the shelf than the bottom side edge zone (flange 36). Groove 40 also is provided for receiving the thin rear edge list 46 of shelf 28 as shown in FIG. 1.

Support rail 204 includes upper and lower keyhole shaped, horizontal grooves 206 at the upper and lower extremities of rear vertical flange 30. These keyhole shaped grooves are formed in rearward projections 208 of flange 30, above and below the forwardly projecting portion of console 24. Grooves 206 receive cushion strip members 210 which engage against rear supporting upright 2, or a wall or the like, to accommodate tolerances between the parts and, in essence, accommodate any movement therebetween.

Support rail 204 also has a horizontal, forwardly opening groove 212 at the upper end of lower stiffening flange 32 for receiving a resilient strip bumper 214. This resilient bumper means engages the back side of rear panelling plate 62A to accommodate tolerances and, in essence, absorb any movement between the respective components. To this end, support rail 204 includes a downwardly depending flange 216 which is receivable in recess 202, similarly to flange 90 and recess 88 illustrated in relation to the embodiment in FIG. 2.

The form of the invention shown in FIGS. 11 and 12 includes a novel support piece 218 which is provided for supporting the lower edge of upper panelling plate 60A, similarly to the support provided by supporting piece 84 for panelling plate 60 (FIG. 2). However, support piece 218 provides more contact with the back side of panelling plate 60A, by providing a vertical leg 220 of substantial dimensions for engaging and stabilizing the back side of the panelling plate.

In addition, support piece 218 includes novel complementary interengaging means between the support piece and the support rail to provide a snap-locking, releasable bracket to support upper panelling plate 60A and any intermediate panelling plates. More particularly, the snap-locking, releasable bracket provided by support piece 218 includes an upper horizontal leg 222 and a lower horizontal leg 224. The lower horizontal leg terminates in a hook 226 at the front end thereof for disposition in recess 200 (similarly to hook 82 and recess 80 in Fig. 2). However, lower horizontal leg 224 of the support rail terminates in an arcuate hook 228 at its rear end. This arcuate hook is rotatable into and received by an arcuate slot 230 in the support rail 204. The interengagement between rear hook 228 of bracket 218 and slot 230 of support rail 204 provides rigid and secure engagement between those parts.

Upper horizontal leg 222 of bracket 218 terminates at its rear end in a downwardly depending hook 232 which engages behind a complementary hook 234 on support rail 204 in a snap-locking, releasable fashion. Therefore, bracket 218 is mounted on support rail 204 by first engaging arcuate hook 228 of the bracket within slot 230 of the support rail and rotating the bracket in the direction of arrow "A" (FIG. 12). As the bracket rotates, hook 232 of the bracket snaps behind hook 234 of the support rail to securely hold the bracket in position. This feature is important because the brackets, otherwise, have a tendency to dislodge or to move out of position when mounting numerous panelling plates in a particular shelving and panelling arrangement.

Another feature of the support rail and bracket shown in FIGS. 11 and 12 comprises a forwardly facing groove 236 located above upper flange 38 of the support rail in communication with and as an extension of the spacing beneath lower leg 224 of bracket 204. In other words, groove 236 can receive a component extended thereinto from a position in front of panelling plate 60A, thus hiding the connection. It can be seen that groove 236 has an upwardly shaped, hooked inner end.

FIGS. 13 and 14 show a bookend, generally designated 236, which has a horizontal leg portion 238 terminating in an upwardly extending flange 240 at the inner end thereof. Therefore, it can be seen in FIG. 14 that the bookend can be positioned on top of shelf 28, with leg 238 of the bookend extending beneath rear panelling plate 60A whereby the distal end of the leg can be positioned within slot 236 (FIG. 13) of the support rail, and with the flange 240 positioned within the upwardly hooked portion at the inner end of groove 236 to releasably hold the bookend in position.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A shelving rail means, including means for mounting a shelf in a cantilevered manner projecting outwardly therefrom; and
    a plurality of support brackets removably mounted in spaced relationship on said horizontal support rail means to provide a space therebetween along said horizontal support rail means for supporting a panelling plate with its lower edge spaced above the top surface of the shelf, said support brackets including a vertical leg portion engagable with said panelling plate supported thereon to provide substantial stability to said panelling plates and further including complimentary interengaging means between the support brackets and the rail means providing a snap-locking releasable engagement therebetween;
    said complimentary interengaging means comprising first cam portions positioned adjacent the lower end of said vertical leg portions of said brackets between each bracket and the rail means providing rigid support engagement therebetween and second snap-locking portions positioned adjacent the upper end of said vertical leg portion of said brackets and between the bracket and the rail means providing releasable latch engagement therebetween;
    whereby access means is provided in the space between said brackets, the lower edge of the panelling plate and the top surface of the shelf through which connection lines may be inserted and concealed behind the shelving system.

2. A shelving system for supporting shelves having first and rear edges and panelling plates, comprising:
    horizontal support rail means, including means for mounting a shelf in a cantilevered manner projecting outwardly therefrom; and
    a plurality of support brackets mounted in spaced relationship along said horizontal support rail means for supporting a panelling plate near the rear edge of said shelf, including complimentary interengaging means between the support brackets and the rail means providing a snap-locking, releasable engagement therebetween;
    said complimentary interengaging means comprising first cam portions between each bracket and the rail means providing rigid support engagement therebetween and second snap-locking portions between the bracket and the rail means providing releasable latch engagement therebetween.

3. The system of claim 2 wherein said brackets support the panelling plates with its lower edge spaced above the top surface of the shelf for receiving therethrough a divider appliance which extends transversely across and at least partially divides said shelf, and including means on said horizontal support rail means for releasably engaging the appliance behind the panelling plate.

4. The system in accordance with claim 3 wherein said divider appliance comprises a bookend.

* * * * *

UNITED STATES PATENT AND TRADEMARK OFFICE
CERTIFICATE OF CORRECTION

PATENT NO. : 4,817,538
DATED : April 4, 1989
INVENTOR(S) : Jorgen Michaelsen

It is certified that error appears in the above-identified patent and that said Letters Patent is hereby corrected as shown below:

ON THE TITLE PAGE,
IN THE ABSTRACT

On the title page in column 2, line 9 of the Abstract, please delete "profile" and substitute therefor --profiled--.

In column 6, line 37, please delete "be" and substitute therefor --by--.

In claim 1, column 8, line 22, please delete "portions of" and substitute therefor --portion on--.

Signed and Sealed this

Fourteenth Day of July, 1992

Attest:

DOUGLAS B. COMER

*Attesting Officer*     *Acting Commissioner of Patents and Trademarks*